US012631934B2

(12) United States Patent
Deng

(10) Patent No.: US 12,631,934 B2
(45) Date of Patent: May 19, 2026

(54) MACH-ZEHNDER-INTERFEROMETER FILTER AND RING-BASED WAVELENGTH-DEMULTIPLEXING DEVICE

(71) Applicant: IMEC VZW, Leuven (BE)

(72) Inventor: Qingzhong Deng, Oud-Heverlee (BE)

(73) Assignee: Imec vzw, Leuven (BE)

( * ) Notice: Subject to any disclaimer, the term of this patent is extended or adjusted under 35 U.S.C. 154(b) by 288 days.

(21) Appl. No.: 18/489,226

(22) Filed: Oct. 18, 2023

(65) Prior Publication Data

US 2024/0134242 A1 Apr. 25, 2024
US 2024/0231174 A9 Jul. 11, 2024

(30) Foreign Application Priority Data

Oct. 21, 2022 (EP) .................................... 22202953

(51) Int. Cl.
G02F 1/21 (2006.01)
G02F 1/01 (2006.01)
G02F 1/225 (2006.01)

(52) U.S. Cl.
CPC .............. G02F 1/212 (2021.01); G02F 1/011 (2013.01); G02F 1/225 (2013.01)

(58) Field of Classification Search
CPC .............................. G02F 1/212; G02B 6/29352
See application file for complete search history.

(56) References Cited

U.S. PATENT DOCUMENTS 8,032,027 B2 10/2011 Popovic
8,655,114 B2 2/2014 Popovic

| | | |
|---|---|---|
| 11,092,875 B2 | 8/2021 | Xu et al. |
| 2005/0058396 A1 | 3/2005 | Tormen et al. |
| 2009/0034968 A1 | 2/2009 | Cherchi |
| 2010/0209038 A1 | 8/2010 | Popovic et al. |
| 2011/0150388 A1 | 6/2011 | Shin et al. |

(Continued)

FOREIGN PATENT DOCUMENTS

| CN | 110780506 A | 2/2020 |
|---|---|---|
| CN | 113406750 A | 9/2021 |

(Continued)

OTHER PUBLICATIONS

Extended European Search Report and Written Opinion, Application No. EP 22202953.0, mailed Apr. 19, 2023, 9 pages.

(Continued)

*Primary Examiner* — Chad H Smith
(74) *Attorney, Agent, or Firm* — McDonnell Boehnen Hulbert & Berghoff LLP

(57) ABSTRACT

A device for dielectric material characterization of a test sample is provided. The device includes a resonator block having a groove at at least one side of the resonator block, wherein the groove comprises at least a first inclined surface and a second inclined surface and is configured to contact the test sample via the first inclined surface and/or the second inclined surface. In this regard, the resonator block is configured to generate a rotational electric field coupled between the first inclined surface and the second inclined surface of the groove and further to propagate the rotational electric field partially or fully through the test sample in order to perform dielectric material characterization of the test sample.

16 Claims, 9 Drawing Sheets

(a)

(b)

(56) References Cited

U.S. PATENT DOCUMENTS

| | | | | |
|---|---|---|---|---|
| 2021/0041644 A1* | 2/2021 | Fincato | ............... | G02B 6/4215 |
| 2022/0069908 A1* | 3/2022 | Parker | ................... | H04B 10/40 |

FOREIGN PATENT DOCUMENTS

| | | |
|---|---|---|
| WO | 2007014218 A2 | 2/2007 |
| WO | 2007014218 A3 | 6/2007 |
| WO | 2021259027 A1 | 12/2021 |

OTHER PUBLICATIONS

Chen, Hui-Wen, Alexander W. Fang, Jock Bovington, Jonathan D. Peters, and John E. Bowers. "Hybrid silicon tunable filter based on a Mach-Zehnder interferometer and ring resonantor." In 2009 International Topical Meeting on Microwave Photonics, pp. 1-4. IEEE, 2009.

Lira, Hugo LR, Carl B. Poitras, and Michal Lipson. "CMOS compatible reconfigurable filter for high bandwidth non-blocking operation." Optics Express 19, No. 21 (2011): 20115-20121.

Deng, Qingzhong (Quincy). "Scaling Si WDM filters to 16, 32, 64 channels and beyond." Imec, Partner Technical Week, 33 slides.

Jin, Lei, Mingyu Li, and Jian-Jun He. "Highly-sensitive silicon-on-insulator sensor based on two cascaded micro-ring resonators with vernier effect." Optics Communications 284, No. 1 (2011): 156-159.

Tan, D. T. H., A. Grieco, and Y. Fainman. "Towards 100 channel dense wavelength division multiplexing with 100GHz spacing on silicon." Optics express 22, No. 9 (2014): 10408-10415.

La Notte, Mario, and Vittorio MN Passaro. "Ultra high sensitivity chemical photonic sensing by Mach-Zehnder interferometer enhanced Vernier-effect." Sensors and Actuators B: Chemical 176 (2013): 994-1007.

Zhou, Fengjie, Xiaowen Gu, Guang Qian, Yuechan Kong, and Tangsheng Chen. "Band-pass photonic filter based on a ring resonator assisted with an asymmetric MZI." In Sixth Symposium on Novel Optoelectronic Detection Technology and Applications, vol. 11455, pp. 1209-1212. SPIE, 2020.

Watts, Michael R., Tymon Barwicz, Milos Popovic, Peter T. Rakich, Luciano Socci, Erich P. Ippen, Henry I. Smith, and Franz Kaertner. "Microring-resonator filter with doubled free-spectral-range by two-point coupling." In Conference on Lasers and Electro-Optics, p. CMP3. Optica Publishing Group, 2005.

Ding, Yunhong, Minhao Pu, Liu Liu, Jing Xu, Christophe Peucheret, Xinliang Zhang, Dexiu Huang, and Haiyan Ou. "Bandwidth and wavelength-tunable optical bandpass filter based on silicon microring-MZI structure." Optics express 19, No. 7 (2011): 6462-6470.

Kohli, Niharika, Bruno Lee Sang, Frédéric Nabki, and Michaël Ménard. "Tunable bandpass filter with serially coupled ring resonators assisted MZI." IEEE Photonics Journal 13, No. 4 (2021): 1-8.

* cited by examiner

MACH-ZEHNDER-INTERFEROMETER FILTER AND RING-BASED WAVELENGTH-DEMULTIPLEXING DEVICE

CROSS-REFERENCE TO RELATED APPLICATIONS

The present application is a non-provisional patent application claiming priority to European Patent Application No. EP 22202953.0, filed Oct. 21, 2022, the contents of which are hereby incorporated by reference.

FIELD OF THE DISCLOSURE

The present disclosure relates to the field of integrated photonics for optical communication. The disclosure is concerned with optical filters for wavelength division multiplexing (WDM). The disclosure provides a Mach-Zehnder-Interferometer (MZI) filter, which can be used as a WDM filter. Moreover, the MZI filter can be connected to a ring-based filter to implement a WDM filter, wherein the working wavelength range of the WDM filter doubles the working wavelength range of the ring-based filter.

BACKGROUND

An exemplary ring-based WDM device is illustrated in FIG. 1(a). The WDM device comprises a plurality of add-drop ring resonators. FIG. 1(a) shows a typical structure and the transmission spectra of one such ring resonator used in the exemplary WDM device.

The ring resonator is coupled to a bus waveguide and to a drop waveguide, as shown on the left side of FIG. 1(a). The ring resonator has a series of resonance wavelengths, as shown on the right side of FIG. 1(a). When a wavelength of an optical signal that is transported in the bus waveguide is the same as a resonance wavelength of the ring resonator, that wavelength of the optical signal will be coupled by the ring resonator to the drop waveguide, in which it will propagate to a drop port. Otherwise, that wavelength of the optical signal will continue in the bus waveguide and will propagate to a thru port. Notably, a distance of adjacent drop wavelength peaks is named the free spectral range (FSR) of the ring resonator, and illustrated on the right side of FIG. 1(a).

To make the WDM device a WDM filter, a few such ring resonators may be configured to share the same bus waveguide. Each ring resonator can then be tuned to drop one of multiple wavelengths (which may correspond to communication channels) of the optical signal from the bus waveguide into a respective drop waveguide.

Apparently, a maximum working wavelength range of the exemplary ring-based WDM device is limited by the FSR of the ring resonators. If the total communication wavelength range of the optical signal in the bus waveguide is wider than the FSR of the ring resonators, multiple communication channels will be dropped by the same ring resonator, i.e. these communication channels are not demultiplexed by the ring-based WDM device.

SUMMARY

This disclosure and its solution are based further on the following considerations made by the inventors.

To extend the working wavelength range of a ring-based WDM device, as it is shown in FIG. 1(a), one or more MZI filters could be connected to respective drop ports of the drop waveguides that are coupled to one or more ring resonators. This is exemplarily shown in FIG. 1(b) on the left side for one ring resonator and one MZI filter. Each MZI filter could be designed to have a FSR that doubles the FSR of the corresponding ring resonator, and to have a same central working wavelength as the corresponding ring resonator, as is shown in FIG. 1(b) on the right side. When the ring resonator's FSR is configured to be an integer times of the channel spacing of the optical signal in the bus waveguide, this configuration can double the working wavelength range of the WDM device.

However, the exemplary WDM device shown in FIG. 1(b) is difficult to fabricate and prone to process-induced performance degradation. For example, the exemplary WDM device quickly suffers from a degraded performance, if the one or more MZI filters and the one or more ring resonators are not well designed and/or are not well aligned with each other.

The present disclosure provides an MZI filter and an WDM device including the MZI filter, which allow overcoming these technical challenges. For example, to align the MZI filter with the ring resonator it is associated with. For example, is the disclosure provides for the alignment of the FSR of the ring resonator and the FSR of the MZI filter, and their wavelength peaks in the spectra. Another example, is configured to minimize arm length(s) of the MZI filter, in order to minimize the uncertainty of the MZI wavelength peaks caused by fabrication variations.

One example embodiment of this disclosure provides a MZI filter comprising: a first optical coupler with two output waveguides, wherein a first output waveguide and a second output waveguide of the two output waveguides are arranged with an angle of 85°-95° to each other, for example, an angle of 90° to each other; a second optical coupler with two input waveguides, wherein a first input waveguide and a second input waveguide of the two input waveguides are arranged with an angle of 85°-95° to each other, for example, an angle of 90° to each other; a first arm waveguide configured to connect the first output waveguide of the first optical coupler and the first input waveguide of the second optical coupler; wherein the second output waveguide of the first optical coupler is connected to the second input waveguide of the second optical coupler, or wherein the MZI filter further comprises a second arm waveguide configured to connect the second output waveguide of the first optical coupler and the second input waveguide of the second optical coupler.

The MZI filter of the example embodiment may have a minimized arm length configuration. In particular, when the second output waveguide of the first optical coupler is (directly) connected to the second input waveguide of the second optical coupler, then the second arm waveguide is of zero length (meaning there is no second arm waveguide), and the first arm waveguide can have a minimum length as well. For example, in the MZI filter of the first aspect, identical regions of the two paths formed between the two optical couplers—i.e., a first path via the first output waveguide of the first optical coupler and the first input waveguide of the second optical coupler, and a second path via the second output waveguide of the first optical coupler and the second input waveguide of the second optical coupler—can be minimized. This is achieved due to the two roughly 90° angles.

Notably, the first optical coupler may further have at least one input waveguide, for example, a first and a second input waveguide. Similarly, the second optical coupler may further have at least one output waveguide, for example, a first and a second output waveguide.

The MZI filter of the first aspect can be used to build an improved WDM device as it will be described below. The MZI filter of the first aspect can be aligned to a ring resonator of the WDM device in an accurate manner.

In an example embodiment of the MZI filter, the first and/or the second optical coupler is implemented as a directional coupler.

In another example embodiment of the MZI filter, the first and/or the second optical coupler is implemented as a multimode interference (MMI) splitter.

A second example embodiment of this disclosure provides a WDM device comprising: a bus waveguide configured to receive and transport an optical signal; a group of ring resonators optically coupled to the bus waveguide and to a first drop waveguide; a first MZI filter according to the first example embodiment or any of its examples, wherein an input waveguide of the first optical coupler of the first MZI filter is connected to the first drop waveguide, wherein the first arm waveguide of the first MZI filter is provided by a replication of one half of a first ring resonator of the group of ring resonators, and wherein the second output waveguide of the first optical coupler of the first MZI filter is connected to the second input waveguide of the second optical coupler of the first MZI filter.

All the ring resonators of the WDM device may have a same size. For example, all the ring resonators of the WDM device may be identical. Notably, the second output waveguide of the first optical coupler of the first MZI filter being connected to the second input waveguide of the second optical coupler of the first MZI filter means the same as having a second arm waveguide with zero length (i.e., no second arm waveguide).

In the first MZI filter, the difference between the first path and the second path (also referred to as arm length difference) is implemented by the replication of the half of a first ring resonator. This leads to the first MZI filter having exactly twice the FSR than the ring resonator, and thus allows extending the working wavelength range of the WDM device in comparison with only the ring resonator.

The WDM device of the second example embodiment has a wider wavelength working range than, for example, the ring-based WDM device of FIG. 1(a). The first MZI filter can moreover be well aligned with the first ring resonator. For example, the FSR of the first ring resonator and the FSR of the first MZI filter, and their central wavelengths, may be well aligned. The WDM device of the second aspect, due to the replication of the half of the first ring resonator in the first MZI filter, is robust to process variations, and thus achieves a high yield. A process-induced performance degradation can be avoided.

In another example embodiment of the WDM device, the group of ring resonators consists of the first ring resonator; wherein the first ring resonator is optically coupled to the bus waveguide and to the first drop waveguide;

In another example embodiment of the WDM device, the group of ring resonators consists of the first ring resonator and a second ring resonator; wherein the first ring resonator is optically coupled to the bus waveguide and to the second ring resonator; and wherein the second ring resonator is optically coupled to the first ring resonator and to the first drop waveguide.

In another example embodiment of the WDM device, the group of ring resonators comprises three or more ring resonators; wherein the first ring resonator is optically coupled to the bus waveguide; wherein a last ring resonator of the three or more ring resonators is optically coupled to the first drop waveguide; and wherein one or more intermediate ring resonators are arranged between the first ring resonator and the last ring resonator, and the three or more ring resonators are optically coupled with each other.

In another example embodiment of the WDM device, a first half-ring of the first ring resonator and the replication of the half of the first ring resonator arranged in the first MZI filter are produced in the same lithography step using the same mask.

In another example embodiment of the WDM device, the WDM device further comprises: an additional ring resonator arranged next to the first ring resonator along the bus waveguide, the additional ring resonator being coupled to the bus waveguide and to a second drop waveguide; a second MZI filter according to the first example embodiment or any of its examples, wherein an input waveguide of the first optical coupler of the second MZI filter is connected to the second drop waveguide, wherein the first arm waveguide of the second MZI filter is provided by a replication of one half of the additional ring resonator, and wherein the second output waveguide of the first optical coupler of the second MZI filter is connected to the second input waveguide of the second optical coupler of the second MZI filter.

In another example embodiment of the WDM device, the WDM device further comprises: one or more further ring resonators arranged in series with the first ring resonator and the additional ring resonator along the bus waveguide, coupled to the bus waveguide, and respectively coupled to one of one or more further drop waveguides; and one or more further MZI filters, each further MZI filter being configured according to the first example embodiment or any of its examples, wherein an input waveguide of the first optical coupler of each further MZI filter is connected to one of the further drop waveguides; wherein the first arm waveguide of each further MZI filter is provided by a replication of one half of one of the further ring resonators, and wherein the second output waveguide of the first optical coupler of each further MZI filter is connected to the second input waveguide of the second optical coupler of each further MZI filter.

In an example embodiment of the WDM device, each ring resonator, the bus waveguide, and the drop waveguide to which that ring resonator is coupled form an add-drop ring resonator device.

A third example embodiment of this disclosure provides a method for fabricating a WDM device according to the second example embodiment or any of its examples, the method comprising a step of forming at least a part of the first ring resonator and a step of forming the replication of the half of the first ring resonator in a single process step.

In an example embodiment of the method, the single process step comprises lithographical patterning using the same mask to form the at least part of the first ring resonator and the replication of the half of the first ring resonator.

For example, the single process step may comprise a single etching step, using the same mask, to form the at least part of the first ring resonator and the replication of the half of the first ring resonator.

In another example embodiment of the method, the single process step comprises forming a first half-ring of the first ring resonator and forming the replication of the half of the first ring resonator at the same time.

In another example embodiment of the method, a part of each ring resonator of the WDM device and the replication of that ring resonator in the MZI filter coupled to that ring resonator are formed in the single process step.

The method of the third example embodiment allows achieving the same advantages, as described above for the MZI filter of the first aspect and the WDM device of the second aspect, respectively.

Example embodiment as disclosed extend the working wavelength range of an exemplary ring-based WDM device utilizing a MZI filter connected to at least one drop waveguide coupled to a ring resonator in the WDM device. The MZI filter is specially designed such that its arm lengths are minimized, and that the arm length difference is constructed by exactly one half of the ring resonator. This design can double the working wavelength range without the need of tuning to align the working wavelengths of the ring resonator and the MZI filter.

DETAILED DESCRIPTION

Figure 2:
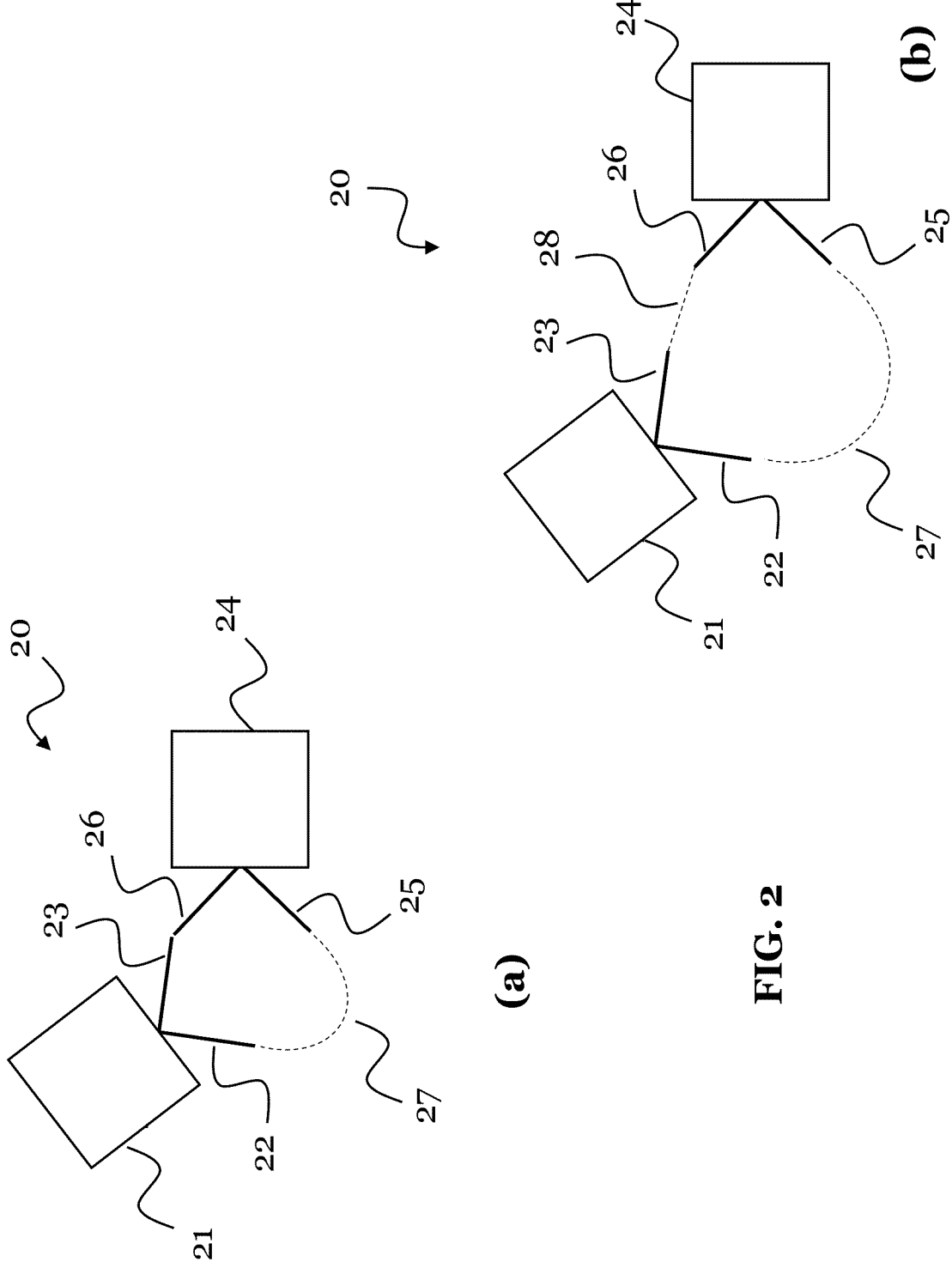
FIG. 2 shows two MZI filters according to an example embodiment.

FIG. 2(*a*) and FIG. 2(*b*) show two MZI filters 20 according to this disclosure. Each MZI filter 20 of FIG. 2 can be used as a standalone filter to perform wavelength demultiplexing, or can be used in a WDM device, for instance, the WDM device 30 shown in FIG. 3. Each MZI filter 20 is designed for providing minimum arm lengths and to be accurately aligned with a ring resonator in the WDM device 30.

Each MZI filter 20 comprises a first optical coupler 21 and a second optical coupler 24. The first optical coupler 21 has two output waveguides 22, 23, namely a first output waveguide 22 and a second output waveguide 23. The first output waveguide 22 and the second output waveguide 23 are arranged with an angle in a range of 85°-95° to each other. For example, they can be arranged with an angle of 90° to each other. The second optical coupler 24 has two input waveguides 25, 26, namely a first input waveguide 25 and a second input waveguide 26. The first input waveguide 25 and the second input waveguide 26 are arranged with an angle in a range of 85°-95° to each other. For example, they can be arranged with an angle of 90° to each other.

Each MZI filter 20 further comprises a first arm waveguide 27, which is configured to connect the first output waveguide 22 and the first input waveguide 25 of the second optical coupler 24. For instance, the first arm waveguide 27 may have a half-ring shape.

The MZI filter 20 shown in FIG. 2(*b*) also comprises a second arm waveguide 28, which is configured to connect the second output waveguide 23 and the second input waveguide 26. For instance, the second arm waveguide 28 can be a straight connection between the two waveguides 23 and 26, however, other shapes are possible. For example, the second arm waveguide 28 may have a minimum length necessary to connect the two waveguides 23 and 26.

In the MZI filter 20 shown in FIG. 2(*a*), instead of comprising the second arm waveguide 28, the second output waveguide 23 is connected directly to the second input waveguide 26. That is, this MZI filter 20 does not have the second arm waveguide 28.

Both MZI filters 20 may use one or two directional couplers as the first optical coupler 21 and/or as the second optical coupler 24. Additionally or alternatively, both MZI filters 20 may use one or two MMI splitters as the first optical coupler 21 and/or as the second optical coupler 24.

Figure 3:
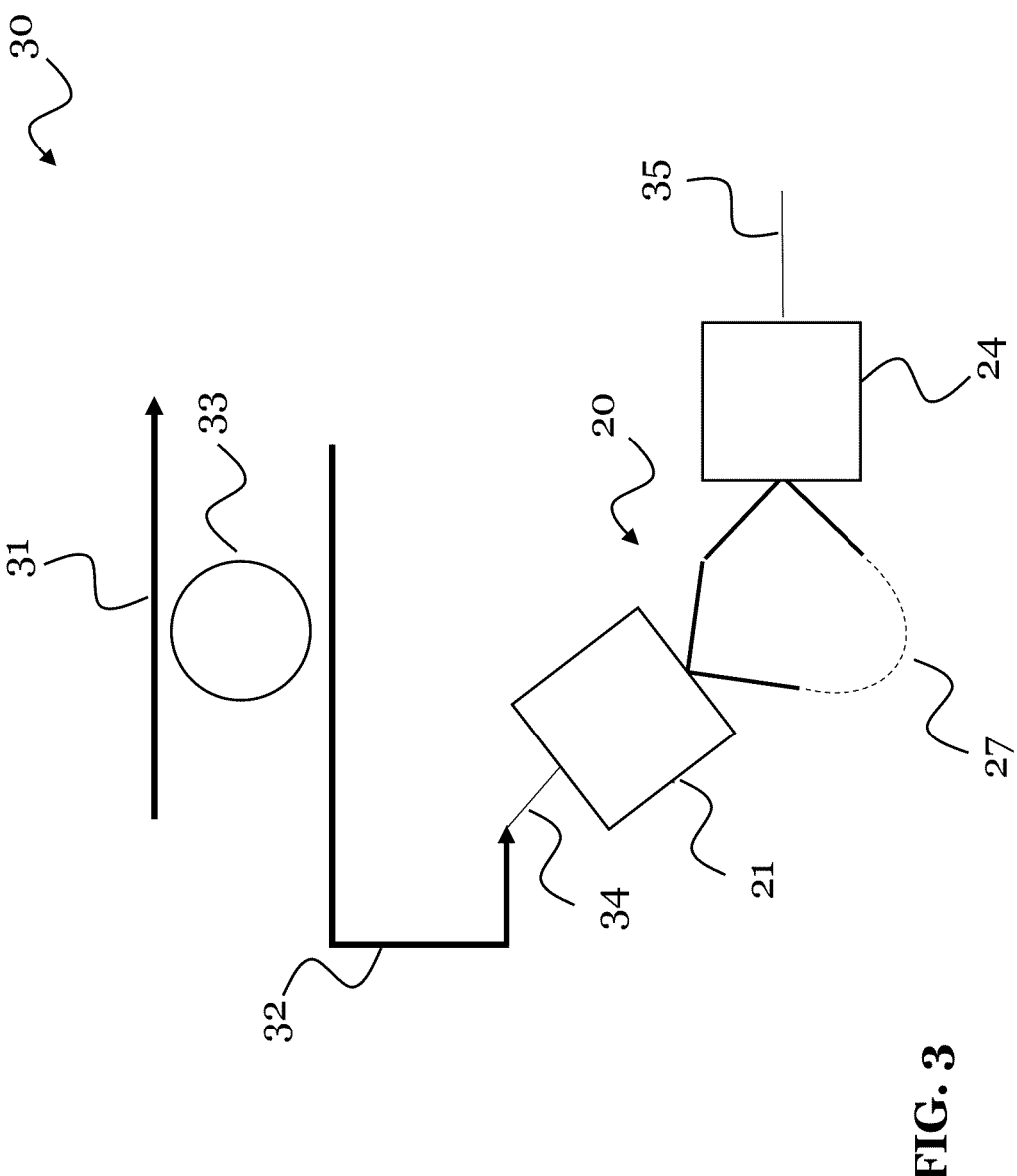
FIG. 3 shows a WDM device according to an example embodiment with one ring resonator.

FIG. 3 shows a WDM device 30 according to this disclosure. The WDM device 30 is configured to be used as a standalone filter for performing wavelength demultiplexing. The WDM device 30 may be referred to as a ring-based WDM device. The WDM device 30 may generally comprise one or more MZI filters 20 as shown in FIG. 2(*a*).

The WDM device 30 comprises a bus waveguide 31, which is configured to receive and transport an optical signal. Further, the WDM device 30 comprises one or more groups of ring resonators, each group of ring resonators being coupled to the bus waveguide 31. As an example, FIG. 3 shows a WDM device 30 with one group of ring resonators, which is optically coupled to the bus waveguide 31 and to a first drop waveguide 32 (which may also be referred to as a ring resonator output waveguide 32). Each group of ring resonators may comprise one or more ring resonators. Each group of ring resonators comprises at least a first ring resonator 33. Each group of ring resonators may consist of the first ring resonator 33. For example, the single group of ring resonators of the WDM device 30 shown in FIG. 3 consists of the first ring resonator 33.

The WDM device 30 further comprises at least one MZI filter 20. The WDM device 30 may also comprise more than one MZI filter 20. For example, the WDM device 30 may comprise one MZI filter 20 per group of ring resonators. The exemplary WDM device 30 of FIG. 3 includes a first MZI filter 20, which is related to the first ring resonator 33 (of the single group of ring resonators).

The first MZI filter 20 is designed and configured as shown in FIG. 2(*a*). Notably, not all elements of the first MZI filter 20 that are shown in FIG. 2(*a*) are shown again in FIG. 3. An input waveguide 34 of the first optical coupler 21 of the first MZI filter 20 is connected to the first drop waveguide 32. In this way, the first MZI filter 20 is related to or coupled to the first ring resonator 33.

The first arm waveguide 27 of the first MZI filter 20 is provided by a replication of one half of the first ring resonator 33. This can be achieved by producing the first half-ring of the first ring resonator 33 and the replication of the half of the first ring resonator 33 in the same lithography step and using the same mask, when fabricating the WDM device 30. In an example embodiment, such as in the WDM device 30 of FIG. 3, the two angles between the first output waveguide 22 and the second output waveguide 23 of the first optical coupler 21 of the first MZI filter 20 and, respectively, between the first input waveguide 25 and the second input waveguide 26 of the second optical coupler 24 of the first MZI filter 20 are both 90°, or at least are as close to 90° as possible.

In the WDM device 30, the second output waveguide 23 of the first optical coupler 21 of the first MZI filter 20 is connected to the second input waveguide 26 of the second optical coupler 24 of the first MZI filter 20, i.e., as mentioned above the second arm waveguide 28 is omitted as in FIG. 2(*a*). The second optical coupler 24 of the first MZI filter 20 may comprise an output waveguide 35.

If the WDM device 30 comprises more than one MZI filter 20, each MZI filter 20 is configured in a manner similar to the first MZI filter 20.

Figure 4:
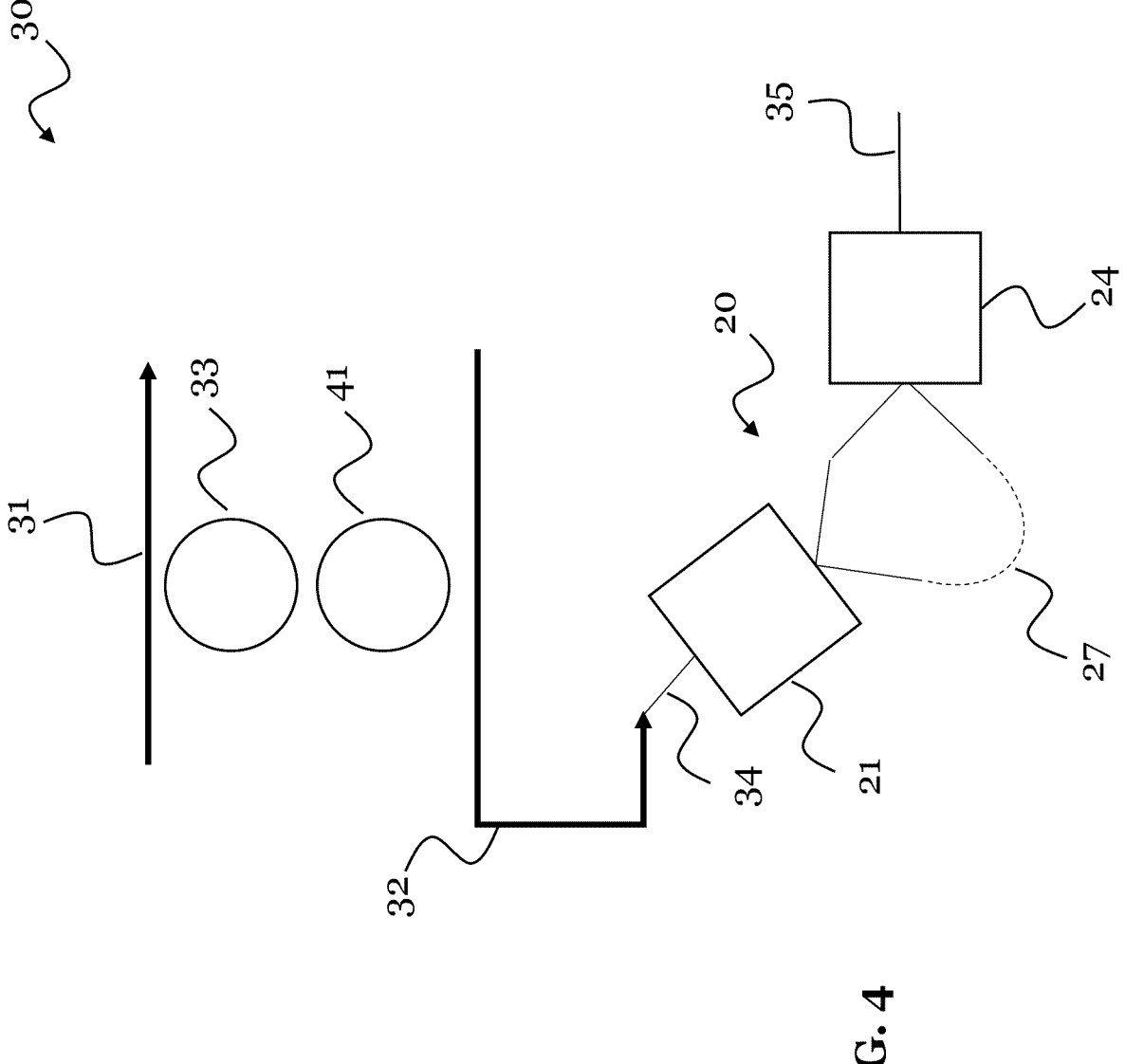
FIG. 4 shows a WDM device according to an example embodiment with two ring resonators.

FIG. 4 shows a WDM device 30 according to this disclosure, which builds on the WDM device 30 of FIG. 3. The WDM device 30 of FIG. 4 has one group of ring resonators consisting of two ring resonators. Namely, the single group of ring resonators consists of the first ring resonator 33 and a second ring resonator 41. The ring resonators 33 and 41 may be of identical shape, or generally identical.

The first ring resonator 33 is optically coupled to the bus waveguide 31 and to the second ring resonator 41. The second ring resonator 41 is accordingly optically coupled to the first ring resonator 33, and is optically coupled to the first drop waveguide 32. The first ring resonator 33 and the second ring resonator 41 may be arranged next to each other between the bus waveguide 31 and the first drop waveguide 32, as shown in FIG. 4.

The first MZI filter 20 of the WDM device 30 of FIG. 4 is configured and arranged like the first MZI filter 20 of the WDM device 30 of FIG. 3. In particular, the input waveguide 34 of the first optical coupler 21 of the first MZI filter 20 is connected to the first drop waveguide 32. In this way, the first MZI filter 20 is related to or coupled to the group of ring resonators consisting of the first and second ring resonators 33, 41.

Figure 5:
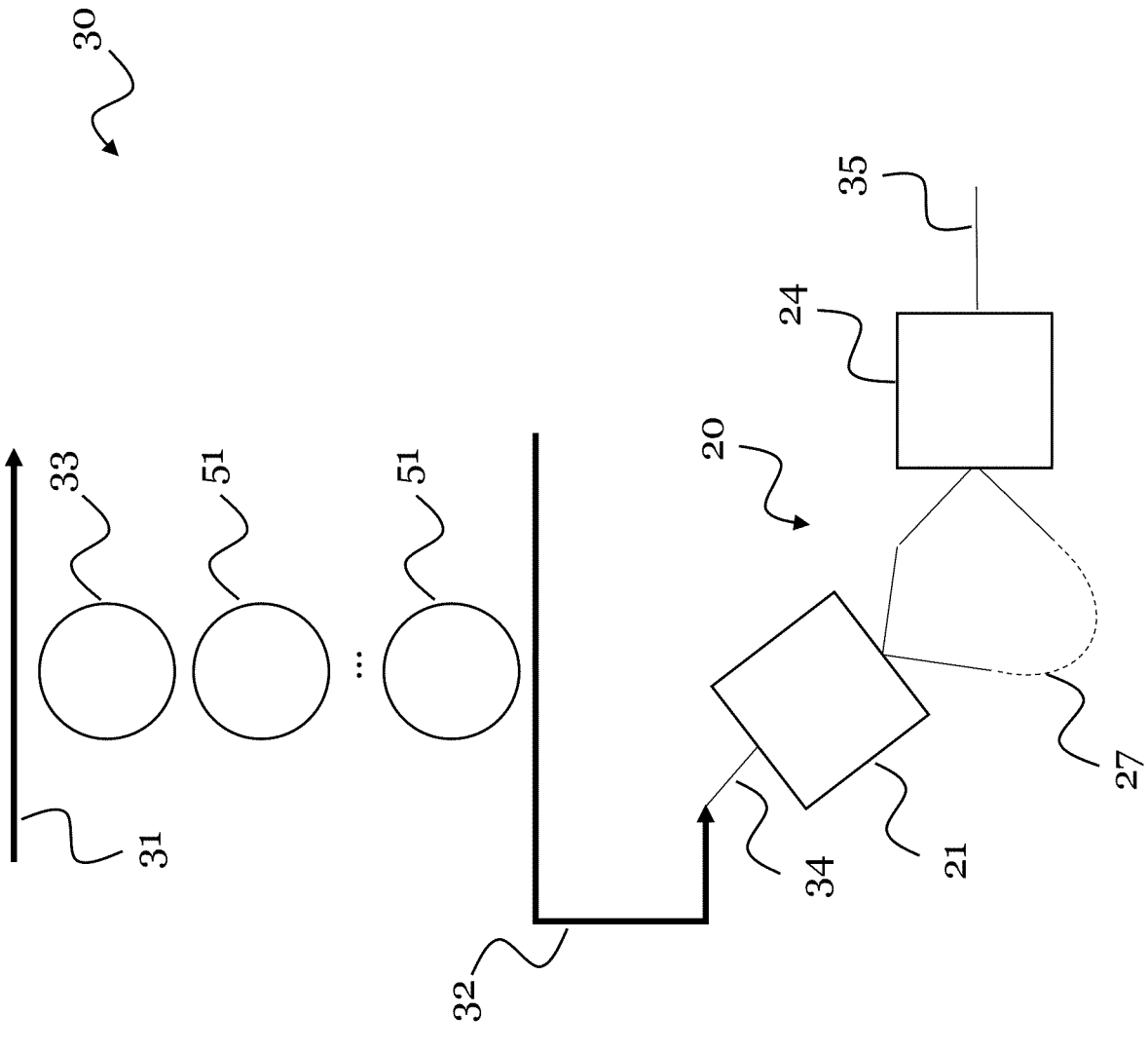
FIG. 5 shows a WDM device according to an example embodiment with multiple ring resonators.

FIG. 5 shows a WDM device 30 according to this disclosure, which builds on the WDM device 30 of FIG. 3. The WDM device 30 of FIG. 5 has one group of ring resonators with multiple ring resonators, for example, three or more ring resonators 33, 51, 52. The ring resonators 33, 51, 52 may all be of identical shape. The ring resonators 33, 51, 52 may be arranged in a row between the bus waveguide 31 and the first drop waveguide 32.

The first ring resonator 33 is optically coupled to the bus waveguide 32. A last ring resonator 52 of the three or more ring resonators is optically coupled to the first drop waveguide 32. One or more intermediate ring resonators 51 are arranged between the first ring resonator 33 and the last ring resonator 52. The three or more ring resonators 33, 51, 52 may be arranged in a row along the direction from the bus waveguide 31 to the first drop waveguide 32, as shown. The three or more ring resonators 33, 51, 52 are optically coupled with each other.

The first MZI filter 20 of the WDM device 30 of FIG. 5 is configured and arranged like the first MZI filter 20 of the WDM device 30 of FIG. 3. In particular, the input waveguide 34 of the first optical coupler 21 of the first MZI filter 20 is connected to the first drop waveguide 32.

Figure 6:
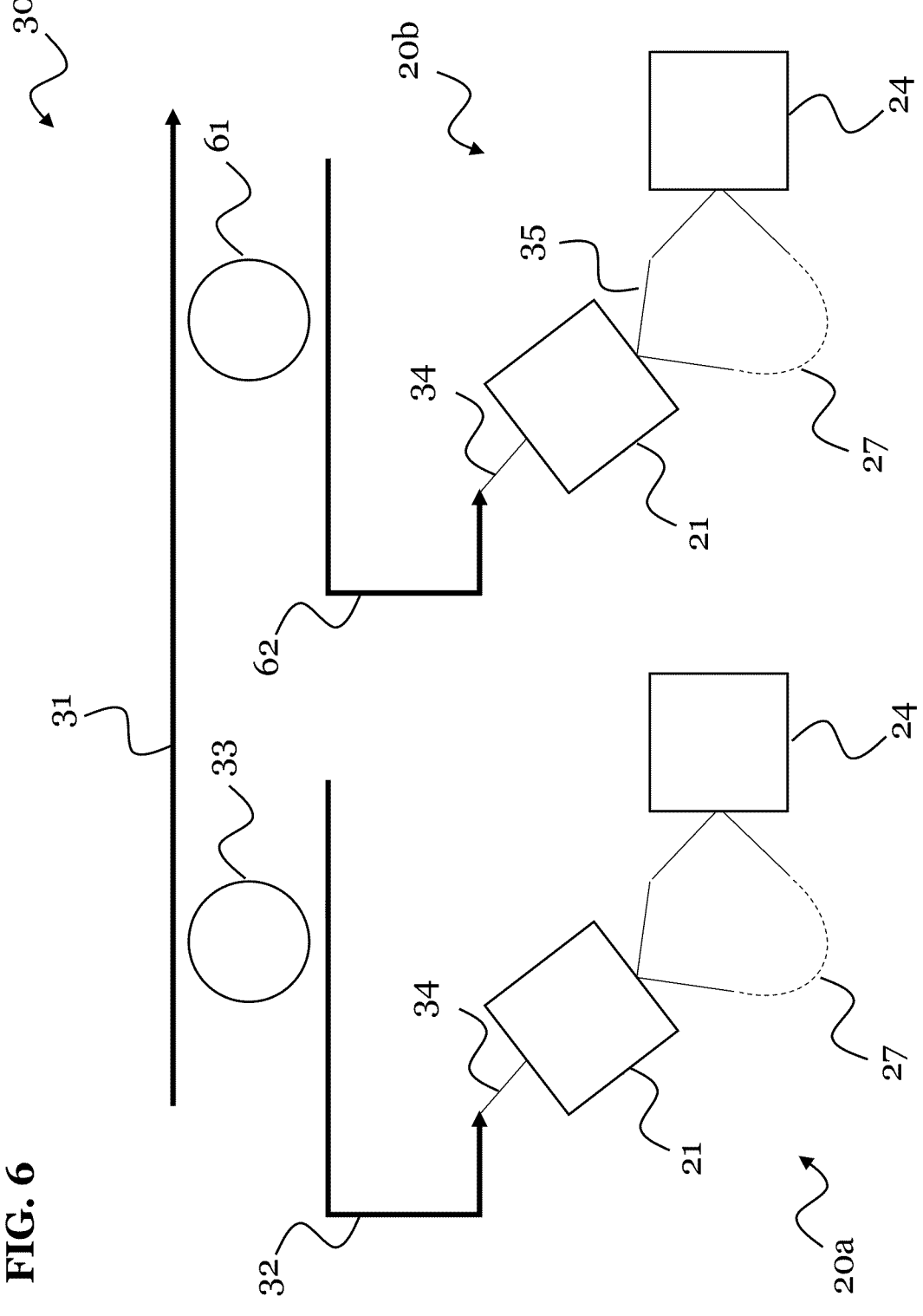
FIG. 6 shows a WDM device according to an example embodiment with two or more ring resonators.

FIG. 6 shows a WDM device 30 according to this disclosure, which builds on the WDM device 30 of FIG. 3. The WDM device 30 of FIG. 6 has two groups of ring resonators. Accordingly, the WDM device 30 of FIG. 6 has also two MZI filters, a first MZI filter 20a and a second MZI filter 20b. There is thus one MZI filter 20a, 20b for each group of ring resonators. Each group of ring resonators may consist of one or more ring resonators. In the example of FIG. 6, each group of ring resonators consists of one ring resonator 33, 61.

In particular, in FIG. 6, an additional ring resonator 61 is arranged next to the first ring resonator 33 in a direction along the bus waveguide 31. The additional ring resonator

61 is coupled to the bus waveguide 31 and to a second drop waveguide 62. The first ring resonator 33 is coupled to the bus waveguide 31 and to the first drop waveguide 32. The ring resonators 33 and 61 may be of identical shape, or may generally be identical.

The first MZI filter 20a of the WDM device 30 of FIG. 6 is configured and arranged like the first MZI filter 20 of the WDM device 30 of FIG. 3. In particular, the input waveguide 34 of the first optical coupler 21 of the first MZI filter 20a is connected to the first drop waveguide 32.

The second MZI filter 20b has the first optical coupler 21 and second optical coupler 24, and all other elements of the MZI filter 20 shown in FIG. 2(*a*). Thereby, the first arm waveguide 27 of the second MZI filter 20b is provided by a replication of one half of the additional ring resonator 61. An input waveguide 34 of the first optical coupler 21 of the second MZI filter 20b is connected to the second drop waveguide 62.

Figure 7:
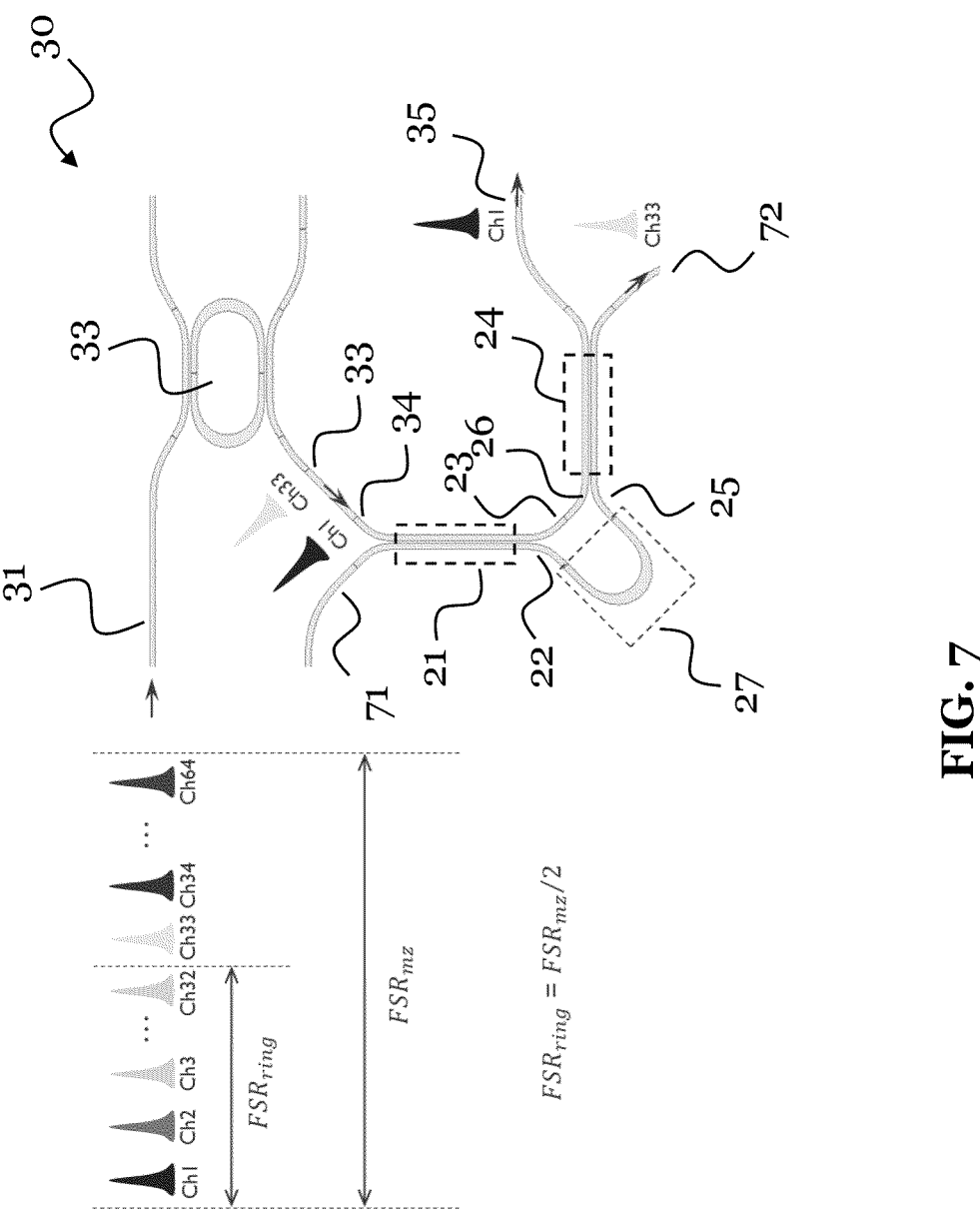
FIG. 7 shows an exemplary WDM device according to an example embodiment.

FIG. 7 shows an exemplary WDM device 30 according to this disclosure. The WDM device 30 of FIG. 7 builds on the WDM device 30 of FIG. 3. The WDM device 30 of FIG. 7 has at least one group of ring resonators consisting of the first ring resonator 33. The first ring resonator 33 is related to the first MZI filter 20. It is shown in FIG. 7 that the first optical coupler 21 of the first MZI filter 20 may comprise two input waveguides 34 and 71, and that the second optical coupler 24 of the first MZI filter 20 may comprise two output waveguides 35 and 72.

It can also be seen from FIG. 7 that a first half-ring of the first ring resonator 33 (the left half of the ring resonator 33) and the replication of this half of the first ring resonator 33, which is arranged in the first MZI filter 20 as the first arm waveguide 27, are completely identical. This may be achieved by producing the first half-ring and the replication of this half-ring in the same lithography step, for example, using the same mask or the same lithography process. The first ring resonator 33 may be made of the first half-ring and a second half-ring (the right half of the first ring resonator 33 in FIG. 7).

A length difference between the first path of the first MZI filter 20 (from the first optical coupler 21 to second optical coupler 24 via the waveguides 22 and 25) and the second path of the first MZI filter 20 (from the first optical coupler 21 to the second optical coupler 24 via the waveguides 23 and 26) may be provided by the replication of the one half of the first ring resonator 33 (arranged in the first path).

The WDM device 30 can be understood to comprise the first ring resonator 33 and the first MZI filter 20 cascaded at a drop port (of the first drop waveguide 32). If the WDM device 70 of FIG. 7 comprises more than one group of ring resonators, a plurality of MZI filters 20 may be cascaded in this way, in particular, on MZI filter 20 at each ring drop port of each drop waveguide 32, 62.

Figure 1:
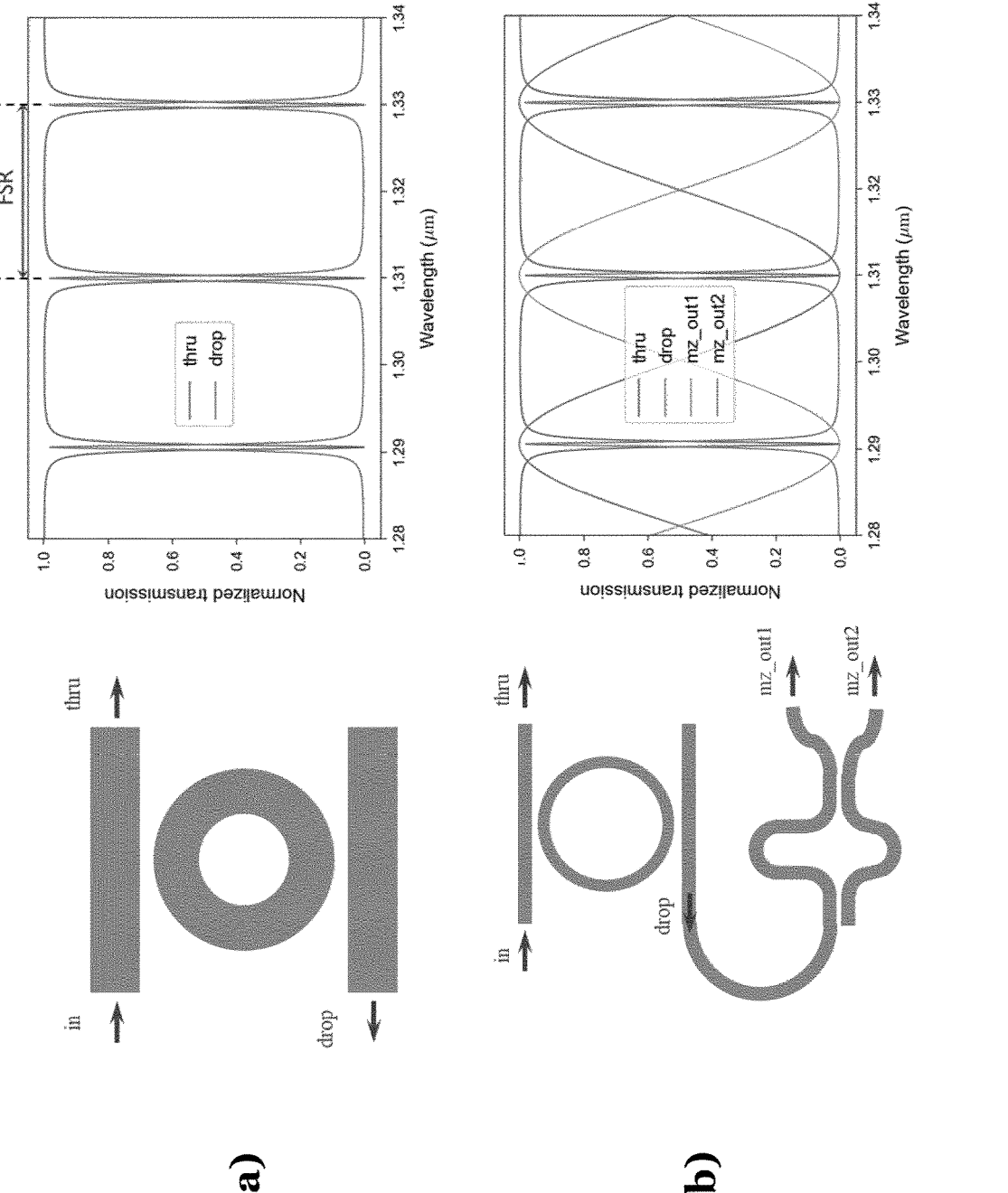
FIG. 1 shows an exemplary ring resonator in (a), and exemplary WDM device in (b).

The WDM device 30 has an extended working wavelength range compared to the exemplary WDM device shown in FIG. 1(*a*). In particular, a FSR of the first MZI filter 20 is twice the FSR of the first ring resonator 33. That is, the WDM device 30 is designed to have FSR doubling of the ring FSR. Further, the FSR of the MZI filter 20 and the FSR of the first ring resonator 33 may have the same central working wavelength, as shown in FIG. 7.

The first ring resonator 33 may have a set of resonance wavelengths that define the FSR of the first ring resonator 33. The FSR of the first MZI filter 20 may be defined by a set of transmission frequency peaks at the first output waveguide 35 of the second optical coupler 24. Each transmission frequency peak may correspond to one of the resonance frequencies of the first ring resonator 33. The first ring resonator FSR may be configured to be an integer times of a channel spacing in the optical signal in the bus waveguide 31. This configuration can double the working wavelength range of the WDM device 30.

The first ring resonator 33 may couple any wavelength included in the optical signal in the bus waveguide 31, which is the same as one of its first resonance wavelengths, from the bus waveguide 31 to the first drop waveguide 32, in which it propagates towards the first MZI filter 20.

The first ring resonator 33 and the first MZI filter 20 of the WDM device 30 of FIG. 7 are designed to align their FSRs and central working wavelengths. For instance, as shown in FIG. 7, the port/waveguide directions of the first optical coupler 21 and the second optical coupler 24 of the first MZI filter 20 are specially designed. The two output waveguides 22 and 23 of the first optical coupler 21 have a 90° angle difference, and the two input waveguides 25 and 26 of the second optical coupler 24 have a 90° angle difference as well, such that the "second arm lengths" of the first MZI filter 20 is minimized (the direct connection of the output waveguide 23 and the input waveguide 26 is provided), and such that the arm length difference is provided by the first arm waveguide 27 and constructed by exactly one half of the first ring resonator 33.

Each further group of ring resonators, or any further ring resonator, which is arranged next to the first ring resonator 33 along the bus waveguide 31, may be configured in a likewise manner as the first ring resonator 33. Each further MZI filter 20 may be configured in a likewise manner as the first MZI filter 20.

Figure 8:
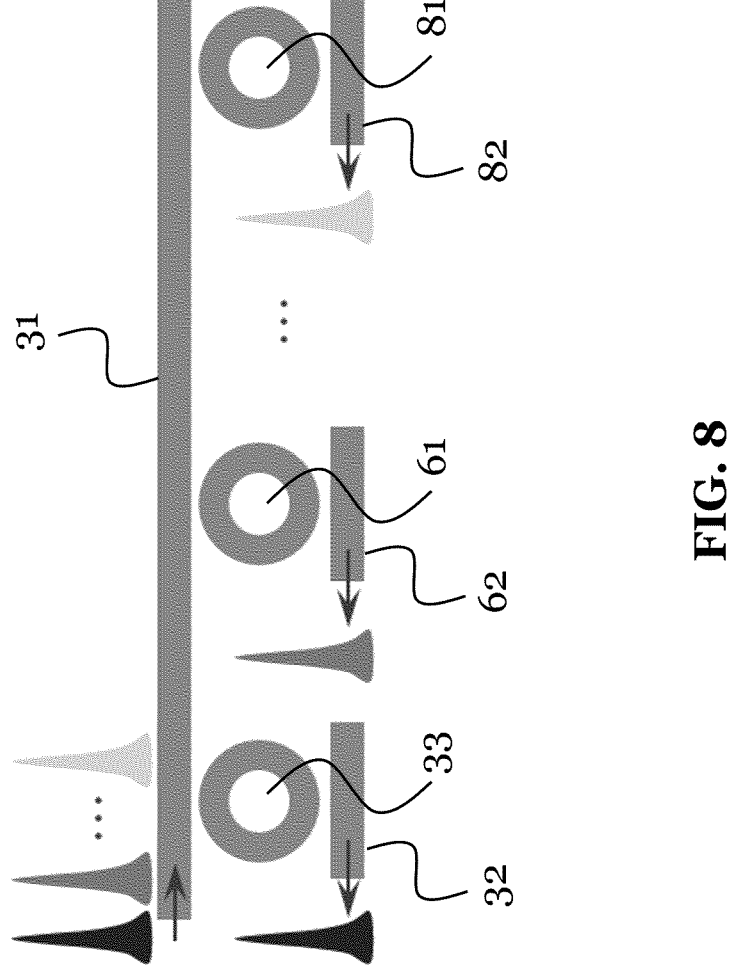
FIG. 8 shows a part of an exemplary WDM device according to an example embodiment.

FIG. 8 shows that in the WDM device 30 a few ring resonators 33, 61, 81 can be configured to share the same bus waveguide 31. Each ring resonator 33, 61, 81 may be tuned to drop one of the wavelengths (corresponding to communication channels) in the optical signal from the bus waveguide 31 to the respective drop waveguide 32, 62, 82, as illustrated. The maximum working wavelength range of this WDM device 30 is not limited by the FSR of the ring resonators 33, 61, 81, because of the MZI filters 20 that are coupled to the drop waveguides 32, 62, 82.

In particular, one or more further ring resonators 81 may be arranged in series with the first ring resonator 33 and the additional ring resonator 61 along the bus waveguide 31. Each ring resonator 33, 61, 81 is coupled to the bus waveguide 31 and is, respectively, coupled to one of the multiple drop waveguides 32, 62, 82.

An input waveguide 34 of the first optical coupler 21 of each MZI filter 20 is connected to one of the drop waveguides 32, 62 82. In each MZI filter 20, the first arm waveguide 27 is provided by a replication of one half of one of the ring resonator 33, 61, 81, to which the MZI filter 20 is coupled or to which the MZI filter 20 is related.

Figure 9:
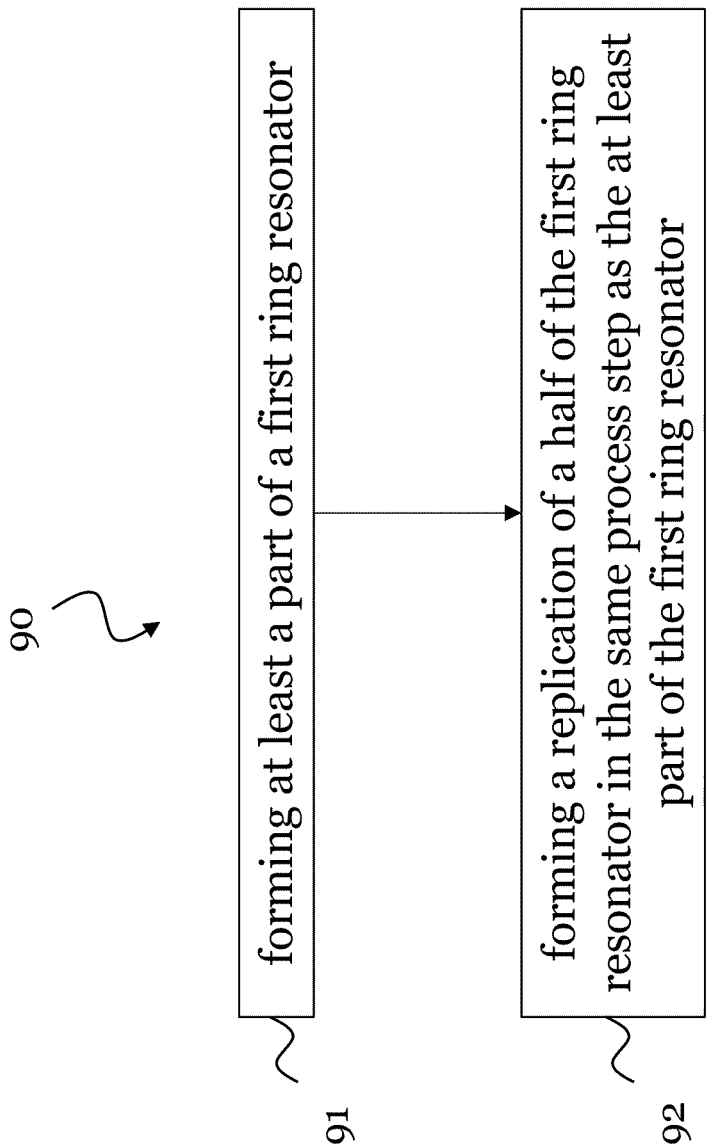
FIG. 9 shows a method according to an example embodiment for fabricating a WDM device.

FIG. 9 shows a method 90 according to this disclosure. The method 90 is suitable for fabricating a WDM device, specifically the WDM device 30 of the FIGS. 3-7. The method 90 comprises a step 91 of forming at least a part of the first ring resonator 33 of the WDM device 30, and a step 92 of forming the replication of the half of the first ring resonator 33 of the first MZI filter 20 of the WDM device 30. These two steps 91 and 92 are performed in a single process step, or even at the same time.

For instance, the two steps 91, 92 may be based on lithographical patterning using the same mask to form the at least part of the first ring resonator 33 and the replication of the half of the first ring resonator 33.

In a WDM device 30 with more than one group of ring resonators, the first ring resonator of each group, for example, the ring resonators 33, 61, and/or 81, may be formed in the same process step as the replications of the (first) halves of these ring resonator 33, 61 and/or 81, which are provided in the respective MZI filters 20, 20a, 20b. Notably, all the first halves of the ring resonators and all the replications of these halves in the MZI filters 20 could be formed in the same process step and/or at the same time.

An advantage of integrated photonics is the capability for mass production. In mass production, each fabricated WDM device 30 of the present disclosure may have slightly different waveguide thickness, linewidth, and/or other device parameters. These differences may contribute to the variation of the individual WDM device's 30 working wavelength.

However, regardless of these deviations, in this disclosure the FSRs and central working wavelengths between the ring resonators 33, 61, 81 and their related MZI filters 20 remain well aligned because: firstly, the MZI arm lengths can be minimized by the design of the first optical coupler 21 and the second optical coupler 24, which reduces the accumulation of a random working wavelength drift; secondly, the arm length difference, provided by the first arm waveguide 27, is constructed as exactly the half of the corresponding ring resonator. That is, any deviation in fabricating the half of the corresponding ring resonator is also experienced by the replication thereof, so that process variations are compensated and do not impact the alignment of ring resonator and MZI filter.

In other solutions, e.g. as shown in FIG. 1(b), different waveguide structures are utilized for the ring resonators and MZI filter. There will thus be a random working wavelength mismatch between the ring resonator and the MZI filter, because the different waveguide structures will have different responses to the waveguide parameter variation. In other words, the yield ratio will be very low without some extra working wavelength tuning. The yield ratio of the WDM device 30 of this disclosure may be improved significantly in comparison.

In the claims as well as in the description of this disclosure, the word "comprising" does not exclude other elements or steps and the indefinite article "a" or "an" does not exclude a plurality. A single element may fulfill the functions of several entities or items recited in the claims. The mere fact that certain measures are recited in the mutual different dependent claims does not indicate that a combination of these measures cannot be used in an advantageous implementation.

What is claimed is:

1. A device comprising:
   a bus waveguide configured to receive and transport an optical signal;
   a group of ring resonators optically coupled to the bus waveguide and to a first drop waveguide;
   a first MZI filter comprising:
      a first optical coupler with two output waveguides, wherein a first output waveguide and a second output waveguide of the two output waveguides are arranged with an angle of 85°-95° to each other, for example, an angle of 90° to each other;
      a second optical coupler with two input waveguides, wherein a first input waveguide and a second input waveguide of the two input waveguides are arranged with an angle of 85°-95° to each other, for example, an angle of 90° to each other;

a first arm waveguide configured to connect the first output waveguide of the first optical coupler and the first input waveguide of the second optical coupler; wherein the second output waveguide of the first optical coupler is connected to the second input waveguide of the second optical coupler, or wherein the MZI filter further comprises a second arm waveguide configured to connect the second output waveguide of the first optical coupler and the second input waveguide of the second optical coupler; and wherein the first and/or the second optical coupler is implemented as a directional coupler; wherein an input waveguide of the first optical coupler of the first MZI filter is connected to the first drop waveguide, wherein the first arm waveguide of the first MZI filter is provided by a replication of one half of a first ring resonator of the group of ring resonators, and wherein the second output waveguide of the first optical coupler of the first MZI filter is connected to the second input waveguide of the second optical coupler of the first MZI filter.

2. The device of claim 1, wherein each ring resonator, the bus waveguide, and the drop waveguide to which that ring resonator is coupled form an add-drop ring resonator device.

3. A method for fabricating a device of claim 2, the method comprising a step of forming at least a part of the first ring resonator and a step of forming the replication of the half of the first ring resonator in a single process step.

4. The method of claim 3, wherein a part of each ring resonator of the WDM device and the replication of that ring resonator in the MZI filter coupled to that ring resonator are formed in the single process step.

5. The method of claim 3, wherein the single process step comprises lithographical patterning using a same mask to form the at least part of the first ring resonator and the replication of the half of the first ring resonator.

6. The method of claim 3, wherein the single process step comprises forming a first half-ring of the first ring resonator and forming the replication of the half of the first ring resonator at the same time.

7. The method of claim 3, wherein a part of each ring resonator of the WDM device and the replication of that ring resonator in the MZI filter coupled to that ring resonator are formed in the single process step.

8. A device comprising:
a bus waveguide configured to receive and transport an optical signal;
a group of ring resonators optically coupled to the bus waveguide and to a first drop waveguide;
a first MZI filter comprising:
a first optical coupler with two output waveguides, wherein a first output waveguide and a second output waveguide of the two output waveguides are arranged with an angle of 85°-95° to each other, for example, an angle of 90° to each other;
a second optical coupler with two input waveguides, wherein a first input waveguide and a second input waveguide of the two input waveguides are arranged with an angle of 85°-95° to each other, for example, an angle of 90° to each other;
a first arm waveguide configured to connect the first output waveguide of the first optical coupler and the first input waveguide of the second optical coupler;
wherein the second output waveguide of the first optical coupler is connected to the second input waveguide of the second optical coupler, or wherein the MZI filter further comprises a second arm waveguide configured to connect the second output waveguide of the first optical coupler and the second input waveguide of the second optical coupler;
wherein an input waveguide of the first optical coupler of the first MZI filter is connected to the first drop waveguide,
wherein the first arm waveguide of the first MZI filter is provided by a replication of one half of a first ring resonator of the group of ring resonators, and
wherein the second output waveguide of the first optical coupler of the first MZI filter is connected to the second input waveguide of the second optical coupler of the first MZI filter.

9. The device of claim 8, wherein the group of ring resonators consist of the first ring resonator and a second ring resonator;
wherein the first ring resonator is optically coupled to the bus waveguide and to the second ring resonator; and
wherein the second ring resonator is optically coupled to the first ring resonator and to the first drop waveguide.

10. The device of claim 8, wherein the group of ring resonators consist of the first ring resonator;
wherein the first ring resonator is optically coupled to the bus waveguide and to the first drop waveguide.

11. The device of claim 8, wherein the group of ring resonators consist of the first ring resonator and a second ring resonator;
wherein the first ring resonator is optically coupled to the bus waveguide and to the second ring resonator; and
wherein the second ring resonator is optically coupled to the first ring resonator and to the first drop waveguide.

12. The device of claim 8, wherein the group of ring resonators comprises three or more ring resonators;
wherein the first ring resonator is optically coupled to the bus waveguide;
wherein a last ring resonator of the three or more ring resonators is optically coupled to the first drop waveguide; and
wherein one or more intermediate ring resonators are arranged between the first ring resonator and the last ring resonator, and the three or more ring resonators are optically coupled with each other.

13. The device of claim 12, wherein a first half-ring of the first ring resonator and the replication of the half of the first ring resonator arranged in the first MZI filter are produced in the same lithography step using the same mask.

14. The device of claim 13, further comprising:
an additional ring resonator arranged next to the first ring resonator along the bus waveguide, the additional ring resonator being coupled to the bus waveguide and to a second drop waveguide;
a second MZI filter comprising:
a first optical coupler with two output waveguides, wherein a first output waveguide and a second output waveguide of the two output waveguides are arranged with an angle of 85°-95° to each other, for example, an angle of 90° to each other;
a second optical coupler with two input waveguides, wherein a first input waveguide and a second input waveguide of the two input waveguides are arranged with an angle of 85°-95° to each other, for example, an angle of 90° to each other;
a first arm waveguide configured to connect the first output waveguide of the first optical coupler and the first input waveguide of the second optical coupler;

wherein the second output waveguide of the first optical coupler is connected to the second input waveguide of the second optical coupler, or wherein the MZI filter further comprises a second arm waveguide configured to connect the second output waveguide of the first optical coupler and the second input waveguide of the second optical coupler; and wherein an input waveguide of the first optical coupler of the second MZI filter is connected to the second drop waveguide, wherein the first arm waveguide of the second MZI filter is provided by a replication of one half of the additional ring resonator, and wherein the second output waveguide of the first optical coupler of the second MZI filter is connected to the second input waveguide of the second optical coupler of the second MZI filter.

15. The device of claim 14, further comprising:

one or more further ring resonators arranged in series with the first ring resonator and the additional ring resonator along the bus waveguide, coupled to the bus waveguide, and respectively coupled to one of one or more further drop waveguides; and one or more further MZI filters, each further MZI filter includes:

a first optical coupler with two output waveguides, wherein a first output waveguide and a second output waveguide of the two output waveguides are arranged with an angle of 85°-95° to each other, for example, an angle of 90° to each other;

a second optical coupler with two input waveguides, wherein a first input waveguide and a second input waveguide of the two input waveguides are arranged with an angle of 85°-95° to each other, for example, an angle of 90° to each other;

a first arm waveguide configured to connect the first output waveguide of the first optical coupler and the first input waveguide of the second optical coupler;

wherein the second output waveguide of the first optical coupler is connected to the second input waveguide of the second optical coupler, or wherein the MZI filter further comprises a second arm waveguide configured to connect the second output waveguide of the first optical coupler and the second input waveguide of the second optical coupler; and wherein an input waveguide of the first optical coupler of each further MZI filter is connected to one of the further drop waveguides;

wherein the first arm waveguide of each further MZI filter is provided by a replication of one half of one of the further ring resonators, and wherein the second output waveguide of the first optical coupler of each further MZI filter is connected to the second input waveguide of the second optical coupler of each further MZI filter.

16. The device of claim 12, wherein each ring resonator, the bus waveguide, and the drop waveguide to which that ring resonator is coupled form an add-drop ring resonator device.

\* \* \* \* \*